(12) United States Patent
Rincon et al.

(10) Patent No.: US 10,649,081 B2
(45) Date of Patent: May 12, 2020

(54) SPACEBORNE SYNTHETIC APERTURE RADAR SYSTEM AND METHOD

(71) Applicant: United States of America as represented by the Administrator of NASA, Washinton, DC (US)

(72) Inventors: Rafael F. Rincon, Greenbelt, MD (US); Kenneth J. Ranson, West River, MD (US); Temilola E. Fatoyinbo Agueh, Washington, DC (US); Lynn M. Carter, Greenbelt, MD (US)

(73) Assignee: United States of America as represented by the Administrators of NASA, Washington, DC (US)

( * ) Notice: Subject to any disclaimer, the term of this patent is extended or adjusted under 35 U.S.C. 154(b) by 294 days.

(21) Appl. No.: 15/719,835

(22) Filed: Sep. 29, 2017

(65) Prior Publication Data

US 2019/0101639 A1    Apr. 4, 2019

(51) Int. Cl.
*G01S 13/90*    (2006.01)
*H01Q 25/00*    (2006.01)
(Continued)

(52) U.S. Cl.
CPC .......... *G01S 13/904* (2019.05); *G01S 7/032* (2013.01); *G01S 13/90* (2013.01); *G01S 13/9023* (2013.01); *G01S 13/9076* (2019.05); *H01Q 1/288* (2013.01); *H01Q 9/0414* (2013.01); *H01Q 21/0025* (2013.01); *H01Q 21/065* (2013.01); *H01Q 23/00* (2013.01); *H01Q 25/00* (2013.01); *G01S 13/9047* (2019.05)

(58) Field of Classification Search
CPC .......................... G01S 13/904; G01S 13/9047
See application file for complete search history.

(56) References Cited

U.S. PATENT DOCUMENTS 6,016,999 A * 1/2000 Simpson .............. B64G 1/1007
   244/159.5
7,825,847 B2 * 11/2010 Fujimura ................ G01S 7/025
   342/25 R (Continued)

*Primary Examiner* — Marc Anthony Armand
(74) *Attorney, Agent, or Firm* — Christopher O. Edwards; Bryan A. Geurts

(57) ABSTRACT

The present invention relates to an advanced spaceborne Synthetic Aperture Radar (SAR) system and method that can provide high resolution measurements of the Earth or planetary surface, overcoming limitations in conventional SAR systems, and reduce development costs. The present invention utilizes advanced and innovative techniques, such as software defined waveforms, digital beamforming (DBF) and reconfigurable hardware, to provide radar capabilities not possible with conventional radar instruments, while reducing the radar development cost. The SAR system architecture employs a modular, low power, lightweight design approach to meet stringent spaceborne radar instrument requirements. Thus, the present invention can enable feasible Earth and planetary missions that address a vast number survey goals, including the measurement of ecosystem structure and extent, surface and sub-surface topography, subsurface stratigraphy, soil freeze-thaw, ice sheet composition and extent, glacier depth, and surface water, among many others.

16 Claims, 5 Drawing Sheets

(51) Int. Cl.
*H01Q 1/28* (2006.01)
*G01S 7/03* (2006.01)
*H01Q 23/00* (2006.01)
*H01Q 21/00* (2006.01)
*H01Q 9/04* (2006.01)
*H01Q 21/06* (2006.01)

(56) References Cited

U.S. PATENT DOCUMENTS

2011/0175771 A1* 7/2011 Raney .................... G01S 7/026
 342/25 F
2018/0074185 A1* 3/2018 Capraro ................ G01S 13/42

* cited by examiner

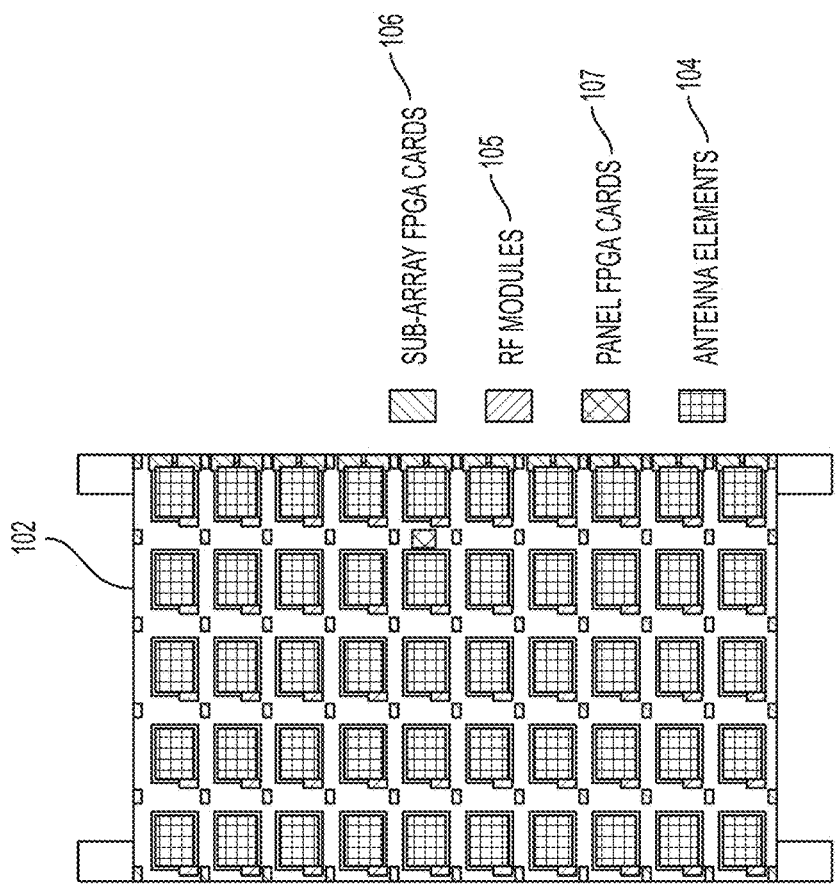
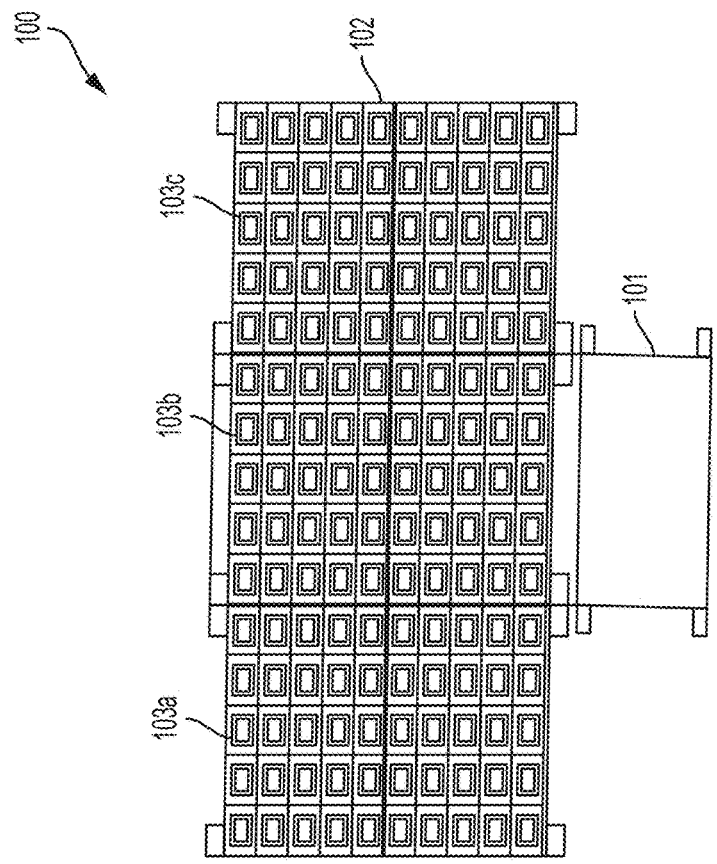
FIG. 1B
FIG. 1A

SPACEBORNE SYNTHETIC APERTURE RADAR SYSTEM AND METHOD

ORIGIN OF THE INVENTION

The invention described herein was made by an employee of the United States Government, and may be manufactured or used by or for the Government for governmental purposes without the payment of any royalties thereon or therefor.

BACKGROUND OF THE INVENTION

1. Field of the Invention

The present invention relates to an advanced spaceborne Synthetic Aperture Radar (SAR) system and method, that can provide high resolution measurements of the Earth's or a planetary body's surface, overcoming limitations inherent in conventional SAR systems, and reducing the development cost. The present invention is applicable to a number of science and commercial applications areas including the measurement of ecosystem structure and extent, surface and sub-surface topography, soil freeze-thaw, ice sheet composition and extent, glacier depth, and surface water, among many others.

2. Description of the Related Art

Synthetic-aperture radar (SAR) is a type of radar which creates two- or three-dimensional images of objects, such as landscapes, using the motion of a radar antenna over a target region, to provide finer spatial resolution than conventional beam-scanning radars. SAR is typically mounted on a moving platform, such as an aircraft or spacecraft. The distance the SAR system travels over a target in the time taken for the radar pulses to return to the antenna creates the large "synthetic" antenna aperture (i.e., 10 Km). Typically, the larger the aperture, the higher the image spatial resolution, regardless of whether the aperture is physical (a large antenna) or "synthetic" (a moving antenna), which allows SAR to create high-resolution images with comparatively small physical antennas.

In operation, successive pulses of radio waves are transmitted to "illuminate" a target scene, and the echo of each pulse is received and recorded. As the SAR device moves, the antenna location relative to the target changes with time. Signal processing of the successive recorded radar echoes allows the combining of the recordings from these multiple antenna positions, which forms the "synthetic antenna aperture" and allows the creation of higher-resolution images than would otherwise be possible with a given physical antenna.

A number of spaceborne SAR instruments are being operated today, but suffer from the disadvantages of limited coverage and capability, as well as a high development cost. Thus, a SAR system which addresses these deficiencies by providing advanced radar architectures and capabilities beyond conventional SAR systems, and which enhance the radar capabilities while reducing the cost of SAR mission, are needed.

SUMMARY OF THE INVENTION

The present invention relates to an advanced spaceborne Synthetic Aperture Radar (SAR) system and method, that can provide high resolution measurements of the Earth's or a planetary body's surface, overcoming limitations inherent in conventional SAR systems, and reducing the development cost. The present invention is applicable to a number of science and commercial applications areas including the measurement of ecosystem structure and extent, surface and sub-surface topography, soil freeze-thaw, ice sheet composition and extent, glacier depth, and surface water, among many others.

The present invention relates to a Synthetic Aperture Radar (SAR) that enables feasible and affordable spaceborne instruments that meet or exceed science needs by the science and commercial remote sensing community. The architecture of the present invention incorporates advancements in radar technology and techniques making this radar capable of imaging modes not possible with conventional radars. The present invention radar's innovative architecture is based on a multi-channel, modular, low power, lightweight design approach that permits system customization for different mission scenarios where the orbit parameters vary (e.g., missions to Earth, the Moon or Mars).

In one embodiment, the instrument architecture of the present invention employs multiple radio frequency (RF) transmit and receive channels, software defined waveform generation, and onboard digital beamforming and is fully programmable providing agile imaging capabilities. In one embodiment, in the transmit operation, each transmit channel is driven with a software program defined waveform. The waveforms are designed with predetermined phase and amplitude such that, in the far field, they generate of one or more energy beams with specific characteristics (pointing angle, beamwidth, side lobe levels, null positions, etc.). In the receive operation, each receive channel is digitized and processed onboard. The onboard processing conditions and frequency-down-converts the signals and digitally forms one or more beams with specific characteristics.

The present invention includes software program-defined multichannel-waveform generators, multi-channel data processors, digital beamforming, onboard radar processing, broadband and high-polarization isolation array antennas, and lightweight/low power RF hardware designs.

In one embodiment, advanced features of the present invention include software program-defined beam steering (no phase-shifters, no moving parts), beam pattern control, imaging both sides of the track, selectable incidence angles, and selectable range resolution, an increase in the measurement swath (area) without degrading the measurement resolution, and the suppression of ambiguities or localized interference in the receiver signal by appropriate null-steering of the antenna pattern. In one embodiment, the antenna gain, beam pointing angle, and sidelobe structure can be programmed in real-time for specific tasks. Furthermore, multiple beams can be synthesized on both sides of the flight-track, as well as nadir, using a single nadir-looking antenna (no moving parts), thus increasing the coverage area.

In one embodiment, the present invention includes spaceborne architecture of radar technologies and techniques developed for the airborne L-band Digital Beamforming SAR and for the P-band polarimetric and interferometric instruments. In one embodiment, the SAR instrument of the present invention includes architecture optimized for P-band operation (435 MHz center frequency). However, the architecture is also applicable to other long wavelength bands, in particular L-band (1.26 GHz center frequency).

In one embodiment, the instrument architecture is also fully polarimetric SAR (measures horizontal transmit-horizontal receive (HH), vertical transmit-vertical receive (VV), horizontal transmit-vertical receive (HV), and vertical transmit-horizontal receive (VH) polarizations). In one exemplary embodiment, the SAR imaging capability of the present invention, is that the resolution, swath, and imaging angles can be modified in flight, providing the necessary agility to perform a variety of imaging modes after launch. The architecture also permits other radar operational modes of scientific and commercial interest, besides SAR, such as nadir altimetry, scatterometry, and passive radar (reflected signals of opportunity).

In one embodiment, a synthetic aperture radar (SAR) apparatus includes: a plurality of instrument panels containing a plurality of panel Radar Digital Units (RDUs), each of the instrument panels including a plurality of subarrays containing a plurality of subarray RDUs; wherein each of the plurality of panel RDUs and the plurality of subarray RDUs are configured to form transmit and receive beams, and to perform waveform generation, data acquisition, and onboard beamforming; a plurality of feed network modules connected to the plurality of subarrays; a plurality of digital and radio frequency (RF) transceiver modules disposed on each of the instrument panels and connected to the plurality of feed network modules, the RF transceiver modules which enable transmit and receive signal conditioning; and a plurality of antenna elements connected to the plurality of transceiver modules for signal transmission and reception; wherein the plurality of transceiver modules are used for both horizontal and vertical polarization channels, and interface both the plurality of subarrays and the plurality of antenna elements.

In one embodiment, the plurality of panel RDUs, the plurality of subarray RDUs, the plurality of transceiver modules, and the plurality of antenna elements, are arranged as subarrays of the plurality of instrument panels.

In one embodiment, the plurality of subarray RDUs includes field programmable gate arrays (FPGAs) in printed circuit boards (PCB).

In one embodiment, the plurality of subarray RDUs includes a plurality of Analog-to-Digital Converters (ADCs) and Digital-to-Analog Converters (DACs).

In one embodiment, the plurality of transceiver modules is based on PCB designs or Monolithic Microwave Integrated Circuit (MMIC) technology; and a receive channel of each of the plurality of transceiver modules is digitized and processed to digitally beamform the beams with predetermined characteristics in a receive operation.

In one embodiment, the plurality of subarrays maintains signal coherence among multiple elements in both digital and RF domains, and enable centralized waveform generation and data acquisition.

In one embodiment, the FGPAs of the plurality of subarray RDUs include: a timing control system; and a plurality of FPGA data processors and waveform generators which enable the centralized waveform generation and data acquisition.

In one embodiment, each of the plurality of waveform generators residing at each of the FGPAs of the plurality of subarray RDUs, creates a trigger signal which is distributed to each of the plurality of subarrays, and synchronized by a radar pulse repetition frequency (PRF), such that the plurality of subarrays digitizes and processes radar signals, to remove timing disturbances and ambiguities caused by noise and part tolerances.

In one embodiment, the plurality of antenna elements is a plurality of identical wideband and high polarization antenna elements.

In one embodiment, the plurality of antenna elements include 50 antenna elements per each of the plurality of instrument panels, formed of 10 subarrays of five antenna elements each.

In one embodiment, each of the plurality of antenna elements includes a dual polarized, aperture-coupled stacked patch antenna, including shells of aluminum walls around each of the plurality of antenna elements, with stacked resonating disks, and coupled to a plurality of feedline strips.

In one embodiment, an array of the plurality of antenna elements operates over a 200 MHz band, centered at 435 MHz.

In one embodiment, the plurality of subarray RDUs are programmed to control at least one of antenna gain, beam pointing angle, or sidelobe structure of the SAR apparatus, in real-time, during transmit and receive operation, and capable of executing multi-mode radar operation including at least one of single, dual, or complete polarimetry SAR imaging, multi-lock angle data collection, simultaneous left and right of track imaging, selectable resolution and swath width, digital beam steering, beam pattern control, nadir SAR altimetry, or scatterometry.

In one embodiment, different data types, including high- or low-resolution polarimetric imaging, interferometry, altimetry or scatterometry, and SAR types including single pass interferometric SAR, scatterometry over multiple beams, and altimetry, Sweep-SAR (Scan on Receive), simultaneous SAR/GNSSR (Global Navigation Satellite Systems-Reflection), and simultaneous active/passive SAR, are implemented.

In one embodiment, the SAR apparatus includes polarimetric SAR, including measuring horizontal transmit-horizontal receive (HH), vertical transmit-vertical receive (VV), horizontal transmit-vertical receive (HV), and vertical transmit-horizontal receive (VH) polarizations).

In one embodiment, the SAR apparatus is used for Earth science measurements, monitoring of the Earth's surface, or exoplanetary surface and subsurface imaging.

In one embodiment, a method of utilizing a synthetic aperture radar (SAR) apparatus includes: providing a plurality of instrument panels containing a plurality of panel Radar Digital Units (RDUs), each of the instrument panels including a plurality of subarrays containing a plurality of subarray RDUs; wherein each of the plurality of panel RDUs and the plurality of subarray RDUs are configured to form transmit and receive beams, and to perform waveform generation, data acquisition, and onboard beamforming; connecting a plurality of feed network modules to the plurality of subarrays; providing a plurality of digital and radio frequency (RF) transceiver modules disposed on each of the instrument panels and connected to the plurality of feed network modules, the RF transceiver modules which enable transmit and receive signal conditioning; and connecting a plurality of antenna elements to the plurality of transceiver modules for signal transmission and reception; wherein the plurality of transceiver modules are used for both horizontal and vertical polarization channels, and interface both the plurality of subarrays and the plurality of antenna elements.

In one embodiment, the method of the present invention further includes: transmitting beamforming with predetermined beam characteristics using software-defined waveforms at each of the plurality of subarrays; and digitizing and processing each receive channel of the plurality of transceiver modules to digitally beamform the beams with predetermined characteristics in a receive operation.

In one embodiment, the method further includes: providing a timing control system; and providing a plurality of FPGA data processors and waveform generators which enable the centralized waveform generation and data acquisition, as part of the FGPAs of the plurality of subarray RDUs.

In one embodiment, the method further includes: creating a trigger signal using each of the waveform generators residing at each of the plurality of FGPAs of the plurality of subarray RDUs; and distributing the trigger signal to each of the plurality of subarrays, and synchronizing the plurality of subarrays by a radar pulse repetition frequency (PRF), such that the plurality of subarrays digitize and process radar signals, to remove timing disturbances and ambiguities caused by noise and part tolerances.

Thus, has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawing is only one exemplary embodiment of the disclosure and not to be considered as limiting in scope.

FIG. 1A shows an instrument array of the SAR system, and FIG. 1B shows the instrument panel of FIG. 1A, according to one embodiment consistent with the present invention.

DESCRIPTION OF THE INVENTION

Figure 2:
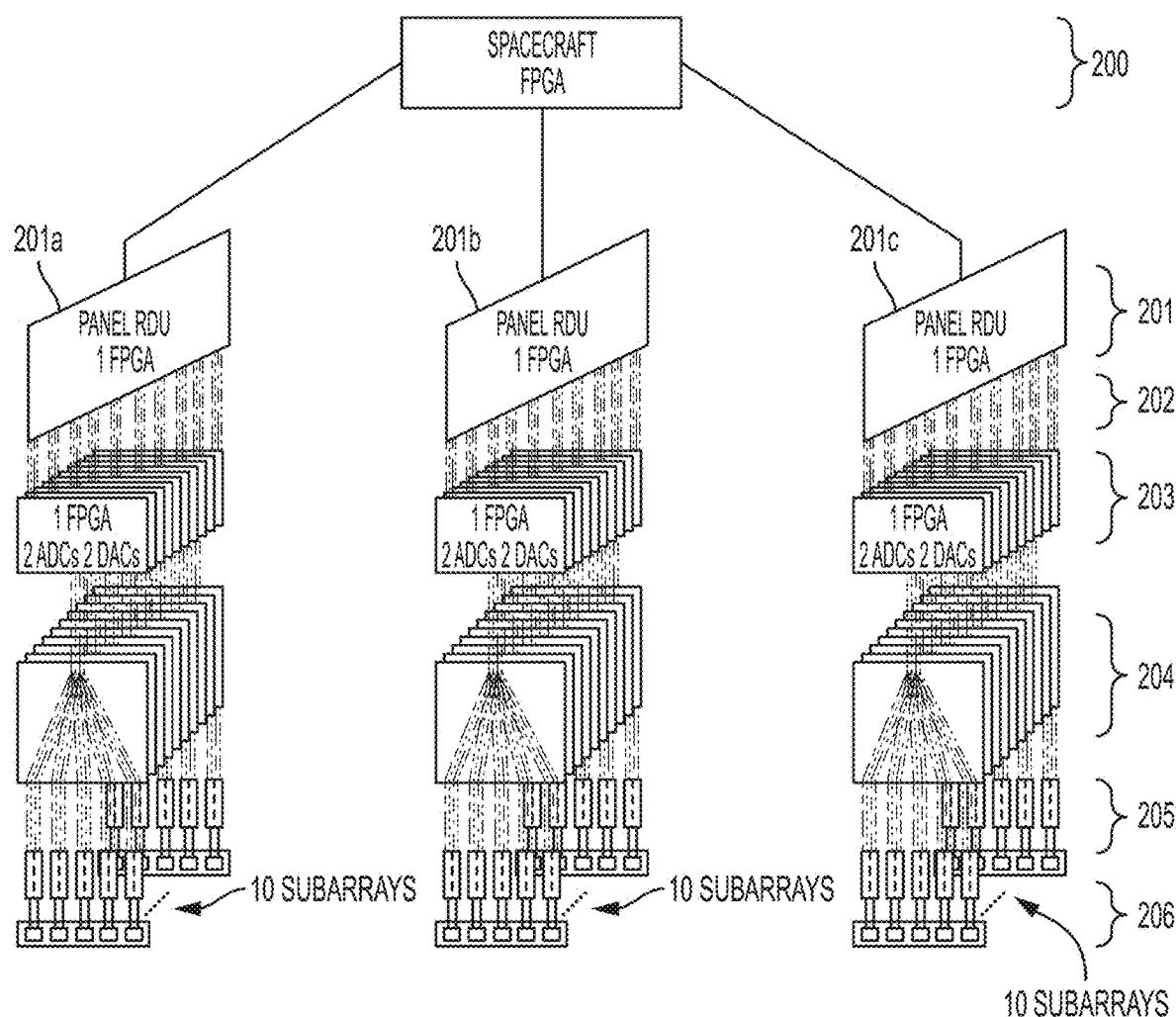
FIG. 2 shows a schematic diagram of the internal architecture of the SAR system according to one embodiment consistent with the present invention.

The present invention relates to an advanced spaceborne Synthetic Aperture Radar (SAR) system and method that can provide high resolution measurements of the Earth or planetary surface, overcoming limitations in conventional SAR systems, and reduce development costs. The present invention enables feasible and affordable spaceborne instruments that meet or exceed science needs by the science and commercial remote sensing community. The architecture of the present invention incorporates advancements in radar technology and techniques making this radar capable of imaging modes not possible with conventional radars.

The present invention is applicable to a number of science and commercial applications areas including the measurement of ecosystem structure and extent, surface and subsurface topography, soil freeze-thaw, ice sheet composition and extent, glacier depth, and surface water, among many others.

The present invention is directed to improving spaceborne SAR systems by using advanced and innovative techniques, such as software defined waveforms, digital beamforming (DBF) and reconfigurable hardware, to provide radar capabilities not possible with conventional radar instruments, while reducing the radar development cost. The SAR system innovative architecture of the present invention employs a novel low power, modular, lightweight design approach, that allows customization of the instrument configuration to meet stringent spaceborne radar instrument requirements for specific mission parameters where the orbit parameters vary (e.g., missions to Earth, the Moon, or Mars). Thus, the present invention can enable feasible Earth and planetary missions that address a vast number survey goals.

The present invention includes software program defined multichannel-waveform generators, multi-channel data processors, onboard digital beamforming, onboard radar processing, broadband and high-polarization isolation array antennas, fully programmable providing agile imaging capabilities, and lightweight/low power RF hardware designs.

Specifically, in one embodiment, the instrument architecture of the present invention employs multiple RF transmit and receive channels. In the transmit operation, each transmit channel is driven with a software program defined waveform. The waveforms are designed with predetermined phase and amplitude such that, in the far field, they generate one or more energy beams with specific characteristics (pointing angle, beamwidth, side lobe levels, null positions, etc.). In the receive operation, each receive channel is digitized and processed onboard. The onboard processing conditions and frequency-down-converts the signals and digitally forms one or more beams with specific characteristics.

In one embodiment, advanced features of the present invention include software program-defined beam steering (no phase-shifters, no moving parts), beam pattern control, imaging both sides of the track, selectable incidence angles, and selectable range resolution, an increase in the measurement swath (area) without degrading the measurement resolution, and the suppression of ambiguities or localized interference in the receiver signal by appropriate null-steering of the antenna pattern. In one exemplary embodiment, the antenna gain, beam pointing angle, and sidelobe structure can be programmed in real-time for specific tasks.

Furthermore, multiple beams can be synthesized on both sides of the flight-track, as well as nadir, using a single nadir-looking antenna (no moving parts), thus, increasing the coverage area.

In one exemplary embodiment, the SAR instrument array 100 (see FIG. 1A) of the present invention, which is attached to a spacecraft 101, utilizes a modular approach that distributes the radar electronics, digital, and antenna subsystems over a plurality of instrument panels 102 (see FIG. 1A).

In one embodiment, the present invention employs a multiple-input multiple-output (MIMO) and modular configuration, which distributes the radar systems into instrument panels composed of "smart" active subarrays. In one exemplary embodiment, as shown in FIG. 1A, a plurality of instrument panels, such as a three-panel 103a, 103b, 103c configuration (i.e., Mars' P-band instrument configuration), includes a plurality of antenna arrays 104 (see FIG. 1B), and digital and transceiver (RF) modules 105-107 distributed over each of the plurality of instrument panels 103a-c, that enable SAR imaging. The actual number of panels is determined by mission requirements, and the panels are foldable for stowing during launch and transit to its destination.

In one exemplary embodiment, the full system distribution with each of the plurality of instrument panels 201 (items 103a-c in FIG. 1A), and which interface with the spacecraft 200, is shown in FIG. 2. In one exemplary embodiment, each of the instrument panels 201 includes a panel radar digital unit (RDU) 201a-c, each interfacing a plurality of subarrays 203 via a plurality of fiber-optics interconnects 202. Each of the instrument panel RDUs 201a-c configures each of the plurality of subarrays 203 and beamforms the "receive" data. In turn, in one exemplary embodiment, each of the plurality of RDU subarrays 203 includes a feed network 204 (i.e., a plurality of feed network modules 204), each connected to a plurality of transmit receive (T/R) modules 205, and each connected to a plurality of antenna elements 206. The fiber-optics interconnects 202 are high speed fiber interconnects 202 for the data transfer to the instrument panel RDUs 201.

In one exemplary embodiment, the spacecraft RDU 200 interfaces with the plurality of instrument panel RDUs 201 (e.g., three panel RDUs 201a-c), each of which interfaces with a plurality of subarray RDU 203 units (e.g., ten subarrays 203), which each interface with a feed network module 204 (e.g., ten feed network modules 204). In one exemplary embodiment, the feed network modules 204 each interface with a transmit/receive (T/R) module 205 (e.g., ten T/R modules 205), and each T/R module interfaces with an antenna unit 206 (e.g., ten antenna units 206).

In one exemplary embodiment, the spacecraft RDU 200 and plurality of instrument panel RDUs 201 are field programmable gate array (FPGA) based printed circuit boards (PCB) that employ radiation tolerant FPGAs. They are designed to be highly compact and power efficient. The FPGAs of the instrument panel RDUs 201 perform programming of each instrument panel 201a-c, provide synchronization, beamform the receive data from each instrument panel 201a-c, provide housekeeping, and interface with the spacecraft RDU 200 and the plurality of subarray RDUs 203.

Figure 3:
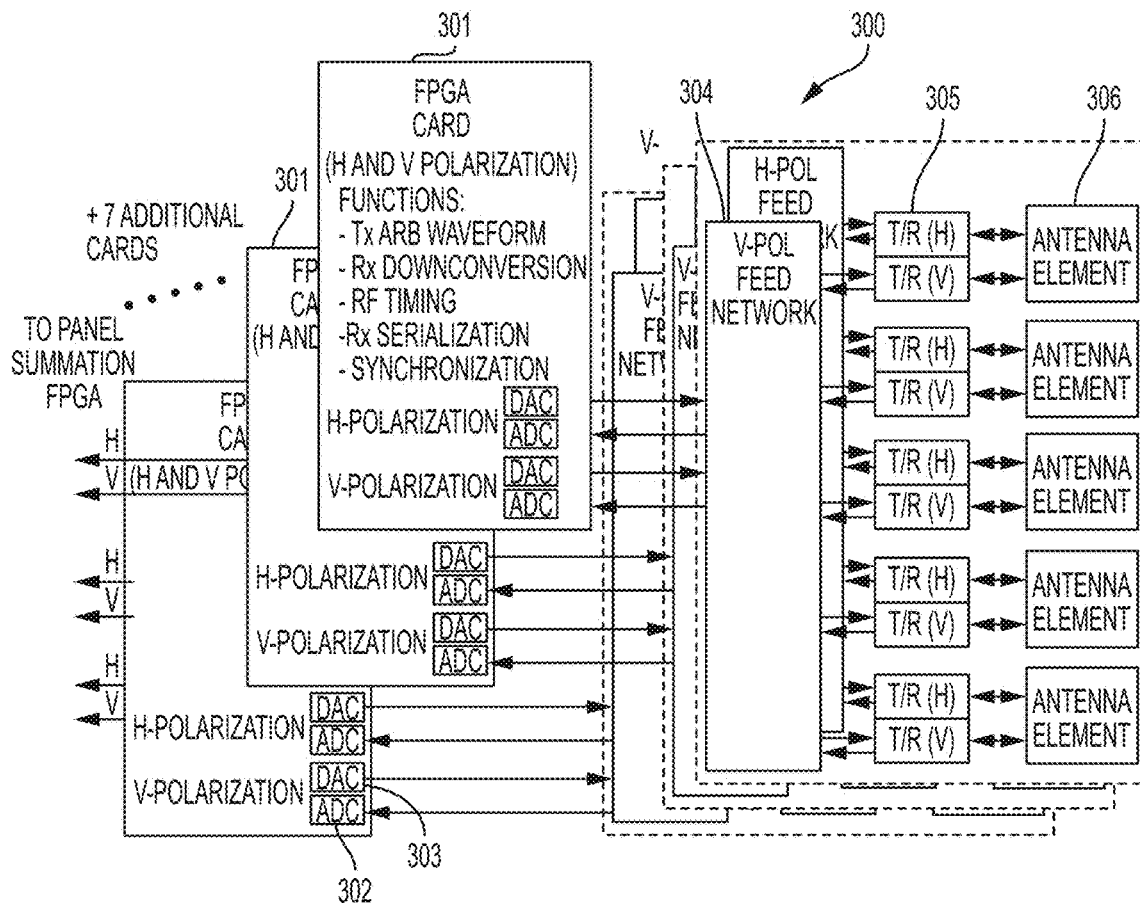
FIG. 3 shows a sub-array system of the internal architecture of the SAR system, according to one embodiment, consistent with the present invention.

In one exemplary embodiment, FIG. 3 shows a panel architecture 300 view of the plurality of subarray RDUs 301 (item 201 in FIG. 2), feed networks 304 (item 204 in FIG. 2), transmit/receive (T/R) modules 305 (item 205 in FIG. 2), and antenna elements 306 (item 206 in FIG. 2). In one exemplary embodiment, each subarray RDU 301 is an FPGA-based PCB, and includes Analog-to-Digital Converters (ADCs) 302 and Digital-to-Analog Converters (DACs) 303 (see FIG. 3).

In one exemplary embodiment, as shown in FIG. 3, a timing control system for each subarray RDU 301 works in the background alongside main FPGA data processors and waveform generators. The timing system utilizes a software program implemented by a processor (FPGAs), to maintain signal coherence among multiple elements in both the RF and digital domains. A high stability central oscillator provides the frequency reference for the entire instrument panel 300. Buffering and regeneration at the sub-array 301 and panel 300 levels, is strategically placed for the software program to maintain adequate signal and jitter levels throughout the distribution network. High speed ADC clocks are synthesized locally from the global reference clock using the software program.

In one exemplary embodiment, radar operations are controlled by a central trigger signal distributed by the software program to each sub-array 301 processor, and synchronized by the radar pulse repetition frequency (PRF). Receive, transmit and calibration windows are synchronized by the software program, to this trigger. The FPGA/DAC-based waveform generator residing at each subarray 301 creates the trigger signal and the sub-array 301 FPGA/ADC 302v digitizes and processes the radar signals, using the software program, to remove timing disturbances and ambiguities caused by noise and part tolerances.

Accordingly, the present invention utilizes a distributed digital electronics architecture that implements advanced waveform modulation techniques to provide the full beam steering agility while significantly reducing the system power consumption. The present invention reduces the number of digital-to-analog converters (DACs) 303 and analog-to-digital converters (ADCs) 302 (see subarray card 301 of FIG. 3) and enables centralized waveform generation and data acquisition with reduced power and mass. In one embodiment, the present invention employs digital beamforming (DBF) to implement multi-mode radar techniques in a single platform without slewing the antenna, which is designed to have a reduced weight.

In one exemplary embodiment, as shown in FIG. 3, the multi-channel transmit/receive (T/R) radio frequency (RF) modules 305 interface both the RDU 301 and the antenna elements 306, to condition and amplify the transmit and the receive signals. Identical T/R modules 305 are used for the horizontal (H) and vertical (V) polarization channels. In one exemplary embodiment, in the transmit operation, each transmit channel is driven with software-defined waveforms, generating one or more beams with specific characteristics (pointing angle, beamwidth, side lobe levels, null positions, etc.). In the receive operation, each receive channel is digitized and processed onboard, digitally forming beams with specific characteristics.

Figure 4:
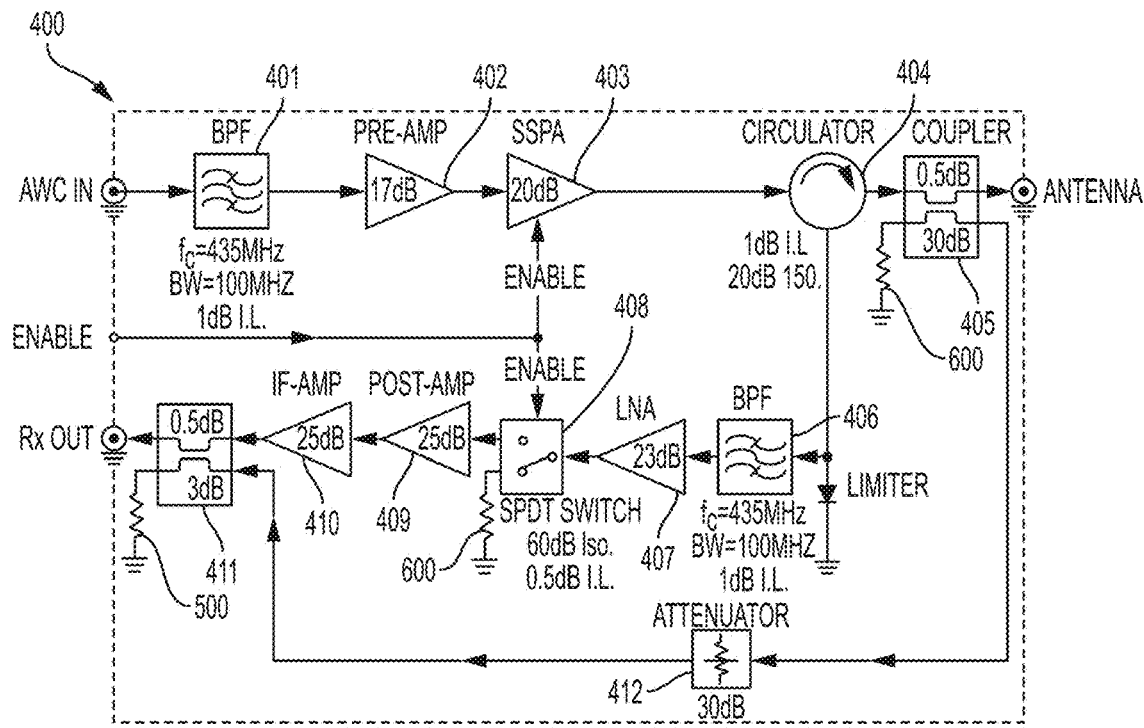
FIG. 4 shows a schematic layout of the electronics of the SAR system, according to one embodiment consistent with the present invention.

In one exemplary embodiment, a generic T/R module 305 architecture is shown in detail in FIG. 4. In the transmit path, the signal from the RDU (item 301 in FIG. 3) is filtered by filter 401, and amplified by solid-state power amplifiers (SSPA) 402, 403, whose gain is chosen to meet requirements. The signal then passes through the circulator 404 and coupler 405, for calibration, before reaching the antenna element (item 306 in FIG. 3).

In one exemplary embodiment, in the receive path, the received signal passes through the same coupler 405 but returns in the receive path through the circulator 404 (see FIG. 4). The signal is then filtered by filter 406 and amplified by a low noise amplifier 407, through a switch 408 for additional isolation, then through two additional amplification stages 409, 410 before passing through the coupler 411 and back to the processor (FPGA of subarray 301 in FIG. 3). The total peak transmit power is shared among the modules, with each transmitting a fraction of the peak power.

In one exemplary embodiment, the design of the transmit/receive (T/R) RF module 305 (see FIG. 3) of the present invention, utilizes compact and high efficient PCB designs or Monolithic Microwave Integrated Circuit (MMIC) technology. In MMIC technology, dense multi-layer active and passive circuitry are fabricated together on a semi-insulated semiconductor substrate. The technology thereby enables the design of radio frequency circuitry with a massive reduction in mass and volume while enabling multi-function and mass production. In addition, MMIC technology also increases the reliability of the design by reducing the number of interconnects and reducing the part-to-part variation. The T/R module 305 (see FIG. 3) also includes external connections to the digital circuitry, bias and control supplies, and transition to the antenna element 306.

Figure 5A:
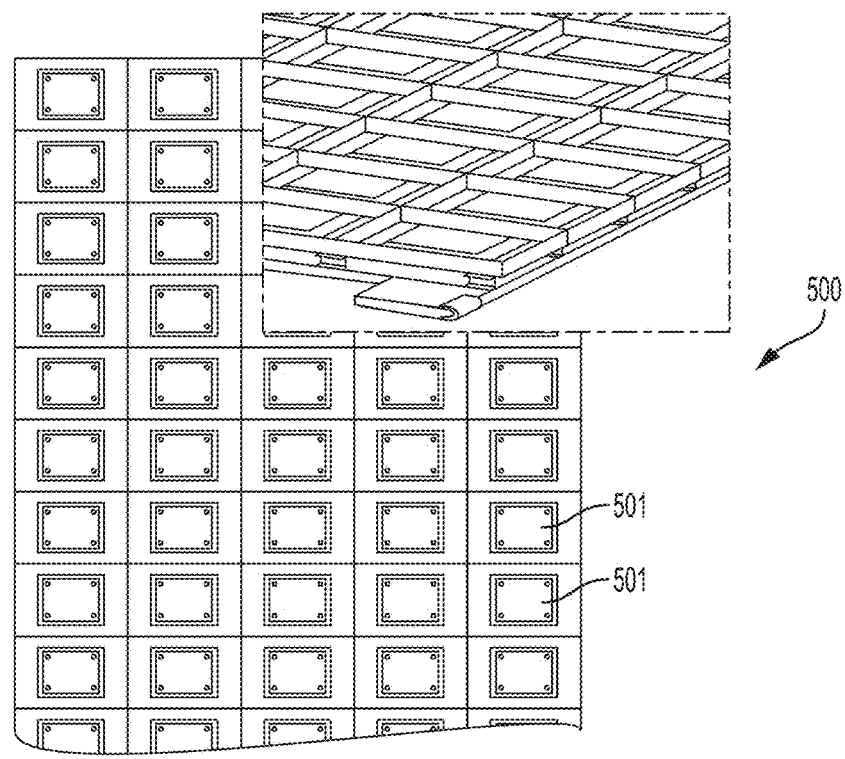
FIG. 5A shows the instrument panel of the SAR system.
Figure 5B:
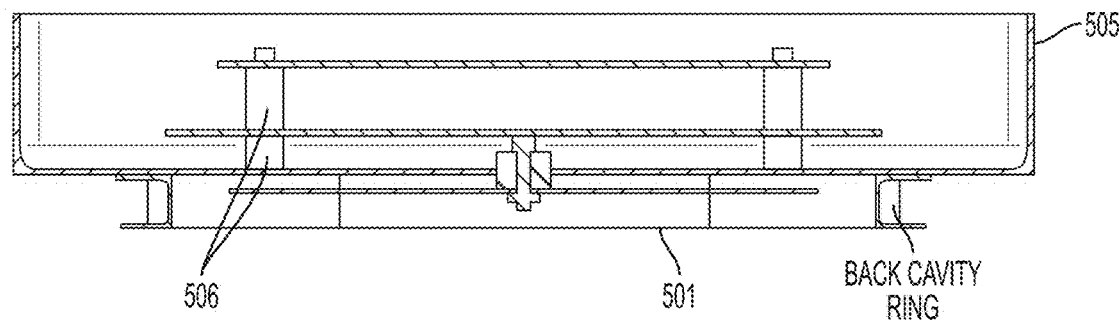
FIGS. 5B and 5C show the side view and perspective view of the SAR system architecture, according to one embodiment consistent with the present invention.
Figure 5C:
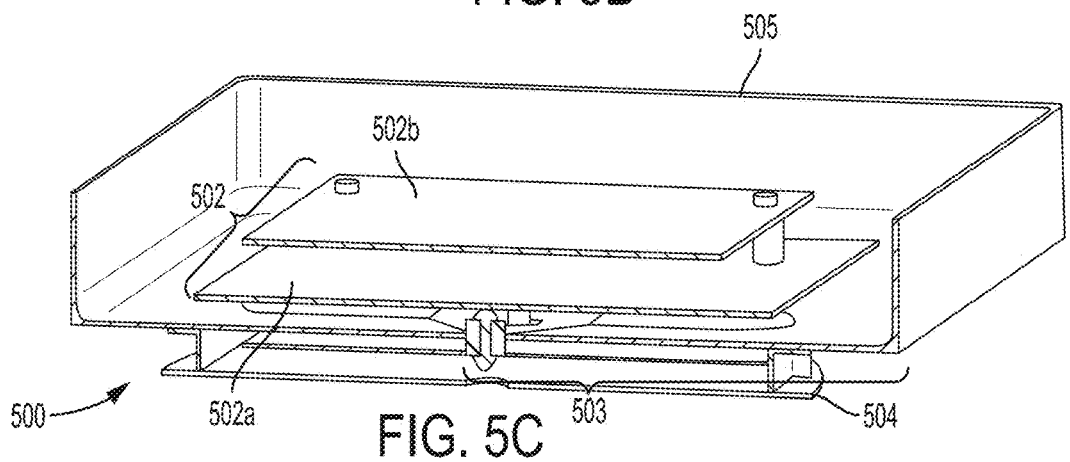

In one exemplary embodiment, the antenna subsystem is made up of identical wideband and high polarization antenna elements 306. The antenna array features a low profile panel, which forms one of the segments of a deployable larger antenna. In one exemplary embodiment, the antenna array operates over a 200 MHz band, centered at 435 MHz. In one exemplary embodiment, the antenna array 500 includes a plurality of antenna elements 501 (e.g. 50 antenna elements) (items 102 in FIG. 1B) per instrument panel (panel 102 in FIG. 1B), forming ten subarrays of five antenna elements 501 each, in an exemplary 3.5 m×2.62 m panel construction (see FIG. 5A). In one exemplary embodiment, each antenna element 501 includes a dual polarized, aperture-coupled stacked patch antenna 502 (see FIG. 5B). In this exemplary embodiment, the two orthogonal polarizations are excited via two input ports connected to two feedline strips 503 that are electromagnetically coupled to a crossed slot cavity-backed 504 aperture in the ground plane (see FIG. 5C). The aperture is in turn electromagnetically coupled to the two resonating disks or patches 502a, 502b situated directly above it.

In one exemplary embodiment, the antenna elements 501 are made of thin aluminum sheet parts, with the stacked resonating disks 502 and coupling feedline strips 503 supported by dielectric standoffs and spacers 506 (see FIG. 5). In one embodiment, all the surfaces are curved into slightly non-planar shapes for increased stiffness, which ensures higher mechanical resonance frequencies, while minimizing weight. For smooth beam steering operation, mutual coupling variations and effects are minimized using thin aluminum walls 505 around each antenna element 501, forming tray-like shells 505 together with the ground plane sections of each element 501. A supporting aluminum honeycomb panel and attachment structures supports all 50 antenna elements 501 in the panel 500 as well as the T/R modules and RDU PCBs (see FIG. 1B and FIG. 3).

The present invention synthesizes multiple antenna beams, simultaneously or interleaved, permitting the implementation of non-conventional imaging that can overcome fundamental limitations of conventional radar systems. The advantages of the present invention include an increase in the measurement swath without reducing the received antenna gain, and the suppression of ambiguities or localized interference in the receiver signal by appropriate null-steering of the antenna pattern.

Figure 6:
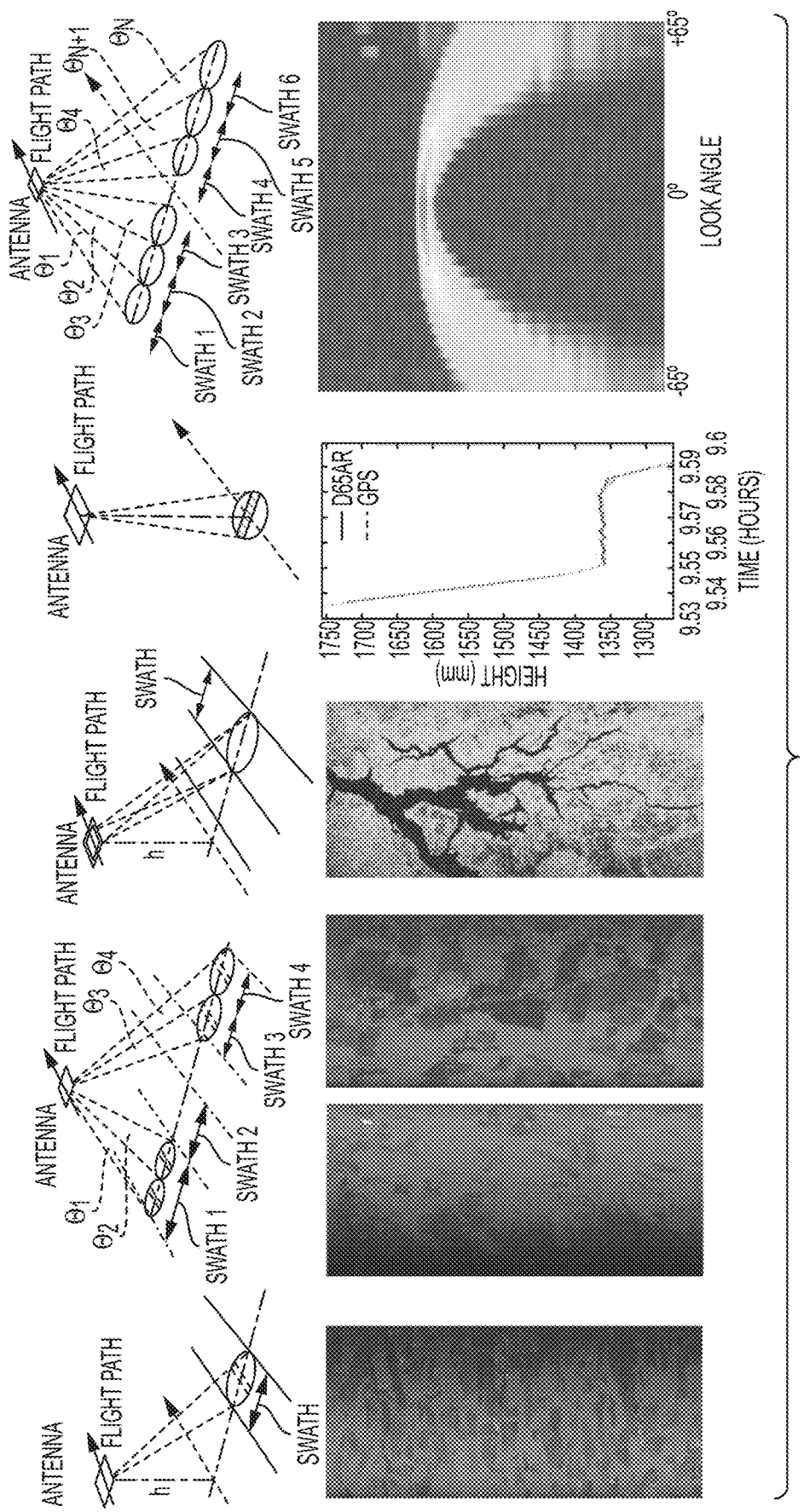
FIG. 6 shows the multiple types of radar imaging that a SAR system can implement, according to one embodiment consistent with the present invention.

In one exemplary embodiment, the radar architecture is fully programmable and capable of multi-mode radar operation including polarimetric synthetic aperture radar (SAR) imaging, nadir SAR altimetry, and scatterometry (see FIG. 6). In one exemplary embodiment, the antenna gain, beam pointing angle, and sidelobe structure can be programmed in real-time for specific tasks. Further, multiple beams can be synthesized on both sides of the flight-track, as well as the nadir, using a single nadir-looking antenna, thus, increasing the coverage area.

In one embodiment, the present invention includes advance programmable features such as: single, dual, or full polarimetry, multi-lock angle data collection; simultaneous left and right of the track imaging; selectable resolution and swath width; digital beam steering (no moving parts); and beam pattern control, among others (see FIG. 6).

In one embodiment, the present invention includes spaceborne architecture of radar technologies and techniques developed for the airborne L-band Digital Beamforming SAR and for the P-band polarimetric and interferometric instruments. In one embodiment, the SAR instrument of the present invention includes architecture optimized for P-band operation (435 MHz center frequency). However, the architecture is also applicable to other long wavelength bands, in particular L-band (1.26 GHz center frequency). In one embodiment, the present invention utilizes a novel P-band (70 cm in wavelength) SAR instrument, which is characterized by full polarimetry, high resolution (<6 m), and programmable beams.

In one embodiment, the instrument architecture is also fully polarimetric SAR (measures horizontal transmit-horizontal receive (HH), vertical transmit-vertical receive (VV), horizontal transmit-vertical receive (HV), and vertical transmit-horizontal receive (VH) polarizations).

In one exemplary embodiment, the SAR imaging capability of the present invention, is that the resolution, swath, and imaging angles can be modified in flight, providing the necessary agility to perform a variety of imaging modes after launch. In one exemplary embodiment, the present invention allows for smart data collection, where a single radar system can provide different data types and other radar operational modes of scientific and commercial interest besides SAR, such as high- or low-resolution polarimetric imaging, interferometry, nadir altimetry or scatterometry, and passive radar (reflected signals of opportunity), depending on the requirements defined for each surface target. For example, several embodiments of synthetic aperture radar (SAR) include single pass interferometric SAR, scatterometry over multiple beams, and altimetry. Other techniques, including Sweep-SAR, simultaneous SAR/GNSSR (Global Navigation Satellite Systems-Reflection), and simultaneous active/passive, can be readily implemented providing great enhancements to the present invention.

The ability of the present invention to rapidly image large areas of the surface using the simultaneous left/right imaging, with no degradation in resolution, allows for a fast performance while still producing full coverage mapping. Alternatively, the present invention allows for a more efficient use of time as the radar instrument trades off operations with other selected instruments. This capability reduces costs and allows for increased spatial coverage.

The present invention is useful for Earth science measurements such as the measurement of biomass and ecosystem structure, permafrost, and soil moisture. A number of other applications range from monitoring of crops and forests, stocks, to subsurface imaging for the identification of buried objects or archeological surveys.

In one embodiment, the present invention provides fine resolution views of subsurface stratigraphy, and includes the ability to expose bedrock and search for buried features that reveal geologic history; for example, locating habitable regions, finding water, and determining planetary hydrology and cryosphere evolution. The long wavelength signals of the present invention penetrate through meters of material, images buried surfaces at fine spatial resolution and full polarimetry, and identify signatures of buried ice and water. In one exemplary embodiment, the present invention images through meters of surface-covered regolith and provides information to characterize the near-surface stratigraphy and geology. The present invention's fine resolution mapping and polarimetry would also provide important information on volcanic processes and lava tubes.

The present invention is also applicable to exoplanetary explorations missions to image the surface and subsurface of moons and planets.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A synthetic aperture radar (SAR) apparatus comprising:
   a plurality of instrument panels containing a plurality of panel Radar Digital Units (RDUs), each of said instrument panels including a plurality of subarrays containing a plurality of subarray RDUs;
   wherein each of said plurality of panel RDUs and said plurality of subarray RDUs are configured to form transmit and receive beams, and to perform waveform generation, data acquisition, and onboard beamforming;
   a plurality of feed network modules connected to said plurality of subarrays;
   a plurality of digital and radio frequency (RF) transceiver modules disposed on each of said instrument panels and connected to said plurality of feed network modules, said RF transceiver modules which enable transmit and receive signal conditioning; and
   a plurality of antenna elements connected to said plurality of transceiver modules for signal transmission and reception;
   wherein said plurality of transceiver modules are used for both horizontal and vertical polarization channels, and interface both said plurality of subarrays and said plurality of antenna elements; said plurality of panel RDUs, said plurality of subarray RDUs, said plurality of transceiver modules, and said plurality of antenna elements, are arranged as subarrays of said plurality of instrument panels; said plurality of subarray RDUs comprises field programmable gate arrays (FPGAs) in printed circuit boards (PCB) wherein said FGPAs of said plurality of subarray RDUs comprise:
   a timing control system; and
   a plurality of FPGA data processors and waveform generators which enable said centralized waveform generation and data acquisition, wherein each of said plurality of waveform generators residing at each of said FGPAs of said plurality of subarray RDUs, creates a trigger signal which is distributed to each of said plurality of subarrays, and synchronized by a radar pulse repetition frequency (PRF), such that said plurality of subarrays digitize and process radar signals, to remove timing disturbances and ambiguities caused by noise and part tolerances, wherein said plurality of antenna elements are a plurality of identical wideband and high polarization antenna elements; and each of said plurality of antenna elements includes a dual polarized, aperture-coupled stacked patch antenna, comprising shells of aluminum walls around each of said plurality of antenna elements, with stacked resonating disks, and coupled to a plurality of feedline strips, wherein said plurality of subarrays maintain signal coherence among multiple elements in both digital and RF domains, and enable centralized waveform generation and data acquisition.

2. The apparatus of claim 1, wherein said plurality of subarray RDUs comprises a plurality of Analog-to-Digital Converters (ADCs) and Digital-to-Analog Converters (DACs).

3. The apparatus of claim 1, wherein said plurality of transceiver modules are based on PCB designs or Monolithic Microwave Integrated Circuit (MMIC) technology; and
   wherein a receive channel of each of said plurality of transceiver modules is digitized and processed to digitally beamform said beams with predetermined characteristics in a receive operation.

4. The apparatus of claim 1, wherein said plurality of antenna elements include 50 antenna elements per each of said plurality of instrument panels, formed of 10 subarrays of five antenna elements each.

5. The apparatus of claim 1, wherein an array of said plurality of antenna elements operates over a 200 MHz band, centered at 435 MHz.

6. The apparatus of claim 5, wherein said plurality of subarray RDUs are programmed to control at least one of antenna gain, beam pointing angle, or sidelobe structure of the SAR apparatus, in real-time, during transmit and receive operation, and capable of executing multi-mode radar operation including at least one of single, dual, or complete polarimetry SAR imaging, multi-lock angle data collection, simultaneous left and right of track imaging, selectable resolution and swath width, digital beam steering, beam pattern control, nadir SAR altimetry, or scatterometry.

7. The apparatus of claim 6, wherein different data types, including high- or low-resolution polarimetric imaging, interferometry, altimetry or scatterometry, and SAR types including single pass interferometric SAR, scatterometry over multiple beams, and altimetry, Sweep-SAR (Scan on Receive), simultaneous SAR/GNSSR (Global Navigation Satellite Systems-Reflection), and simultaneous active/passive SAR, are implemented.

8. The apparatus of claim 7, wherein the SAR apparatus includes polarimetric SAR, including measuring horizontal transmit-horizontal receive (HH), vertical transmit-vertical receive (VV), horizontal transmitvertical receive (HV), and vertical transmit-horizontal receive (VH) polarizations).

9. The apparatus of claim 8, wherein the SAR apparatus is used for Earth science measurements, monitoring of the Earth's surface, or exoplanetary surface and subsurface imaging.

10. A method of utilizing a synthetic aperture radar (SAR) apparatus comprising:
    providing a plurality of instrument panels containing a plurality of panel Radar Digital Units (RDUs), each of said instrument panels including a plurality of subarrays containing a plurality of subarray RDUs;
    wherein each of said plurality of panel RDUs and said plurality of subarray RDUs are configured to form transmit and receive beams, and to perform waveform generation, data acquisition, and onboard beamforming;

connecting a plurality of feed network modules to said plurality of subarrays;

providing a plurality of digital and radio frequency (RF) transceiver modules disposed on each of said instrument panels and connected to said plurality of feed network modules, said RF transceiver modules which enable transmit and receive signal conditioning; and connecting a plurality of antenna elements to said plurality of transceiver modules for signal transmission and reception;

wherein said plurality of transceiver modules are used for both horizontal and vertical polarization channels, and interface both said plurality of subarrays and said plurality of antenna elements; said plurality of panel RDUs, said plurality of subarray RDUs, said plurality of transceiver modules, and said plurality of antenna elements, are arranged as subarrays of said plurality of instrument panels, said plurality of subarray RDUs comprising field programmable gate arrays (FPGAs) in printed circuit boards (PCB), wherein said plurality of transceiver modules are based on PCB designs or Monolithic Microwave Integrated Circuit (MMIC) technology, the method further comprising:

transmitting beamforming with predetermined beam characteristics using software-defined waveforms at each of said plurality of subarrays;

digitizing and processing each said receive channel of said plurality of transceiver modules to digitally beamform said beams with predetermined characteristics in a receive operation, wherein said plurality of subarrays maintain signal coherence among multiple elements in both digital and RF domains, and enable centralized waveform generation and data acquisition, further comprising:

providing a timing control system;

providing a plurality of FPGA data processors and waveform generators which enable said centralized waveform generation and data acquisition, as part of said FGPAs of said plurality of subarray RDUs, the method further comprising:

creating a trigger signal using each of said waveform generators residing at each of said plurality of FGPAs of said plurality of subarray RDUs; and distributing said trigger signal to each of said plurality of subarrays, and synchronizing said plurality of subarrays by a radar pulse repetition frequency (PRF), such that said plurality of subarrays digitize and process radar signals, to remove timing disturbances and ambiguities caused by noise and part tolerances, wherein said plurality of antenna elements are a plurality of identical wideband and high polarization antenna elements, wherein said plurality of antenna elements include 50 antenna elements per each of said plurality of instrument panels, formed of 10 subarrays of five antenna elements each, wherein each of said plurality of antenna elements includes a dual polarized, aperture-coupled stacked patch antenna, comprising shells of aluminum walls around each of said plurality of antenna elements, with stacked resonating disks, and coupled to a plurality of feedline strips.

11. The method of claim 10, wherein said plurality of subarray RDUs comprises a plurality of Analog-to-Digital Converters (ADCs) and Digital-to-Analog Converters (DACs).

12. The method of claim 10, wherein an array of said plurality of antenna elements operates over a 200 MHz band, centered at 435 MHz.

13. The method of claim 12, wherein said plurality of subarray RDUs are programmed to control at least one of antenna gain, beam pointing angle, or sidelobe structure of the SAR apparatus, in real-time, during transmit and receive operation, and capable of executing multi-mode radar operation including at least one of single, dual, or complete polarimetry SAR imaging, multi-lock angle data collection, simultaneous left and right of track imaging, selectable resolution and swath width, digital beam steering, beam pattern control, nadir SAR altimetry, or scatterometry.

14. The method of claim 13, wherein different data types, including high- or low-resolution polarimetric imaging, interferometry, altimetry or scatterometry, and SAR types including single pass interferometric SAR, scatterometry over multiple beams, and altimetry, Sweep-SAR (Scan on Receive), simultaneous SAR/GNSSR (Global Navigation Satellite Systems-Reflection), and simultaneous active/passive SAR, are implemented.

15. The method of claim 14, wherein the SAR apparatus includes polarimetric SAR, including measuring horizontal transmit-horizontal receive (HH), vertical transmit-vertical receive (VV), horizontal transmitvertical receive (HV), and vertical transmit-horizontal receive (VH) polarizations).

16. The method of claim 15, wherein the SAR apparatus is used for Earth science measurements, monitoring of the Earth's surface, or exoplanetary surface and subsurface imaging.

* * * * *